3,717,711
REDUCING FATTY ACID SYNTHESIS WITH A
DIET CONTAINING XYLITOL
Oscar Neal Miller, Montclair, N.J., assignor to Hoffmann-La Roche Inc., Nutley, N.J.
No Drawing. Filed June 22, 1970, Ser. No. 48,549
Int. Cl. A61k 27/00
U.S. Cl. 424—343                                1 Claim

ABSTRACT OF THE DISCLOSURE

The inhibition of fatty acid synthesis is obtained in biological systems by utilizing xylitol as a replacement for other carbohydrates in the diet. The present method involves the inhibition of the lipogenic enzyme activities with resultant inhibition of fatty acid synthesis. Inhibition of fatty acid synthesis by the present method is useful in the treatment of obesity and in correcting conditions of lipid abnormalities.

BRIEF DESCRIPTION OF THE INVENTION

This invention relates to a method of inhibiting fatty acid synthesis in biological systems by introducing into such systems in the diet, xylitol in place of at least some of the rapidly absorbed carbohydrates such as glucose, mannitol, sorbitol, sucrose, fructose and the like. The biological systems in which the present invention may be practiced include intact mammals, particularly non-ruminating mammals.

DETAILED DESCRIPTION OF THE INVENTION

Xylitol is a five carbon sugar alcohol. It occurs as an intermediate in carbohydrate metabolism (member of the glucuronic acid xylulose cycle) as well as naturally, for example, in certain mushrooms The inhibition of fatty acid synthesis in biological sysstems by the use of xylitol is believed to arise from an inhibition of induction by xylitol of fatty acid synthesizing enzyme systems. Thus, the use of xylitol in place of rapidly absorbed carbohydrates which enhance induction of fatty acid synthesizing enzyme systems results in a reduction in fatty acid synthesis.

Fatty acids are synthesized, for example, wherein the cleavage of citrate is catalyzed by citrate cleavage enzyme according to the stoichiometry:

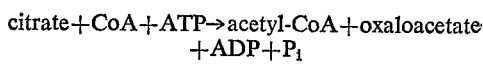

Actyl coenzyme A is then carboxylated by acetyl coenzyme A carboxylase to malonyl coenzyme A. The latter serves as the substrate for the fatty acid synthatase enzyme complex, thus producing fatty acids.

In the conversion of carbohydrate and various amino acids to fat by non-ruminant mammals, citrate is a major source of the acetyl group of acetyl coenzyme A which is utilized for synthesis of fatty acids. Citrate is formed in the mitrochondria by the citrate synthatase reaction. It is then metabolized via the citrate acid cycle. Under conditions when energy intake exceeds energy demand, some citrate is diverted to extra-mitochondrial space of the cell where it is used for fatty acid synthesis, i.e., energy storage.

If xylitol is present in the diet in place of some or all of the rapidly absorbed carbohydrates which enhance induction of fatty acid synthesizing enzymes, i.e., mono- and disaccharide carbohydrates such as glucose, mannitol, sorbitol, sucrose, fructose and the like, then the fatty acid synthesizing enzyme systems are adversely affected and synthesis of fatty acids is reduced.

Xylitol, according to this invention, is useful in the treatment of obesity and in the correction of lipid abnormalities. The compounds are used generally in compositions that are incorporated into various dietary preparations. For example, the compounds can be used in pediatric formulations which are fed to babies, it can be used in various food preparations such as candies, bread, baked goods, pastries and the like. It has generally been found that if the xylitol comprises from about 5% to 25% by weight of the food consumed and replaces from 5% to 25% by weight of the rapidly absorbed monosaccharide or disaccharide carbohydrates in the diet, then the desired effect is achieved. The particular amount of xylitol used and carbohydrates replaced depends upon the requirements and dietary pattern of the particular patient.

It is particularly advantageous to utilize xylitol in place of the rapidly absorbed carbohydrates in the diet of infants because this reduces the formation of fatty acids which thus reduced the formation of adiposites in the infant. The adiposities are cells where excess lipids are stored and one theory is that a reduction in the formation of the adiposites reduces the tendency for obesity in later life.

When using xylitol as a replacement for the rapidly absorbed carbohydrates as described previously, it is considered preferred to build up the tolerance for xylitol in the mammal utilizing it. This is accomplished by gradually increasing the amount of xylitol in the diet until the amount required for maximum inhibition of the induction of the fatty acid synthesizing enzyme systems and efficient reduction of fatty acid synthesis is reached. This amount varies depending upon the condition and size of the patient as well as its sensitivity to xylitol. The reason for this regimen is that the administration of xylitol to those who have not been preconditioned to its use has a tendency to cause disturbances of the intestinal flora and results in diarrhea. However, as indicated, the problem can be overcome by conditioning the patient to the administration of the compound.

The present invention is illustrated in the following examples. All temperatures are in degrees C.

EXAMPLE 1

This example demonstrates the effect of xylitol on in vivo lypogenesis (a) the test was carried out on Charles River female rats weighing 150–190 gms. The rats were divided into four groups and for 20 days meal-fed diets containing the following:

Group 1: 70% glucose
Group 2: 70% starch
Group 3: 20% glucose and 50% starch
Group 4: 20% xylitol and 50% starch Only those of group 4 were adapted. The rate of lipogenesis was measured by determining the amount of $^{14}$C-alanine incorporated per gram of tissue per 30 minutes. The effect on weight was also measured. The results are shown in Table I.

The test method is as follows:

Individual groups of Charles River female rats weighing 150–190 grams were fasted for 2 days and "meal" fed from 9–12 a.m. a diet containing 70% carbohydrate, 24% casein, 5% Phillips and Hart salt mixture and 1% vitamins. When xylitol was used in the diet the following adaptation regimen was employed: meal-feeding for 4 days sequentially with 5%, 10% and 15% xylitol followed by 6–8 days with 20% xylitol. Starch comprised the balance of the 70% total carbohydrate. The adaptation scheme in this experiment was only utilized for xylitol fed rats.

On the last day of refeeding approximately 5 hours after feeding, the animals were lightly anaesthetized with Penthrane (methoxyflurane) and injected in the tail vein using a 27 G. needle as follows: 12.6 mg. alanine as fatty acid precursor, 30.6 mg. α-ketoglutarate as transaminase acceptor and 5 μc. $^{14}$C-alanine (Specific Activity=156 mc./mM.) dissolved in total volume of 0.25 ml. saline pH 7.4–7.6. Rats were pulsed for exactly 30 minutes then killed by decapitation. Livers were excised rapidly, weighed, placed in 50 ml. beakers with 15 ml. $H_2O$ and crudely minced. They were transferred to glass homogenizing tubes and homogenized with 5 strokes of a drill-press driven teflon pestle. Three ml. aliquots of liver homogenates in duplicate were added to tubes containing 2.1 ml. 5N NaOH and saponification was carried out at 90° for 4 hours. The sample were acidified with 2.6 ml. 5 N $H_2SO_4$ and extracted twice with 5 ml. petroleum ether (40–60°). The resulting supernatants were added directly to glass counting vials, evaporated to dryness and 10 ml. Toluene-PPO-POPOP sintillation fluid added. The samples were analyzed for absolute activity in a Packard Tri Carb. The data are expressed as mμM. of $^{14}$C-alanine incorporated/gm. of tissue/30 min.

TABLE I

| Rat No. | Diet percent carbohydrate by weight | Weight gain (gm.) during refeeding | mμM./gm./30 min. |
|---|---|---|---|
| 1 | 70% glucose | 33 | 540.6 |
| 2 | do | 65 | 454.8 |
| 3 | do | 62 | 533.4 |
| 4 | do | 24 | 196.2 |
| 5 | do | 48 | 631. |
| 6 | do | −7 | 1418.6 |
| Average | | +37.5 | 629.1  S.E.M. ±168.9 |
| 7 | 70% starch | 63 | 616.2 |
| 8 | do | 52 | 315.5 |
| 9 | do | 21 | 385.2 |
| 10 | do | 53 | 538.3 |
| 11 | do | 68 | 316.2 |
| Average | | +51.4 | 434.3  S.E.M. ±60.9 |
| 12 | 20% glucose, 50% starch | 40 | 396.3 |
| 13 | do | 44 | 367.7 |
| 14 | do | 78 | 230.5 |
| 15 | do | 57 | 342. |
| 16 | do | 30 | 139.9 |
| 17 | do | 61 | 239. |
| Average | | +51.7 | 285.9  S.E.M. ±40.2 |
| 18 | 20% xylitol, 50% starch | 37 | 217.2 |
| 19 | do | −24 | 158.7 |
| 20 | do | 16 | 291.4 |
| 21 | do | 21 | 175. |
| 22 | do | 32 | 103.3 |
| 23 | do | 17 | 108.9 |
| Average | | +16.5 | 175.7  S.E.M. ±28.9 |

As indicated in Table I, rats fed the diet containing xylitol exhibited only 61.5% the rate of lipogenesis when compared to the non-adapted animals on the 20% glucose containing diet.

(b) A similar test was run on another group of Charles River female rats weighing 150–190 gm. The only difference was that the rats were adapted to the carbohydrate added to their diet in the same manner as described for xylitol in part (a).

The results of the tests are shown in Table II.

TABLE II

| Rat No. | Diet percent carbohydrate by weight | Weight gain (gm.) during refeeding | mμM./gm./30 min. |
|---|---|---|---|
| 2 | 20% glucose | 34 | 446.2 |
| 3 | do | 51 | 153.7 |
| 4 | do | 12 | 597.7 |
| 1 | do | 3 | 347.7 |
| 5 | do | 6 | 310.7 |
| Average | | +21.2 | 371.8  S.E.M. ±73.2 |
| 6 | 20% fructose | 25 | 920.7 |
| 7 | do | 44 | 516.1 |
| 8 | do | 39 | 376.7 |
| 9 | do | 21 | 568.5 |
| 10 | do | 30 | 276. |
| 11 | do | 62 | 358.4 |
| 12 | do | 29 | 664.3 |
| Average | | +35.7 | 525.8  S.E.M. ±82.9 |
| 13 | 20% sucrose | 16 | 557.8 |
| 14 | do | 50 | 407. |
| 15 | do | 16 | 862.2 |
| 16 | do | 29 | 380.4 |
| 17 | do | 41 | 64.8 |
| 18 | do | 21 | 436.9 |
| Average | | +28.8 | 451.5  S.E.M. ±225.5 |
| 19 | 20% xylitol | 11 | 185.1 |
| 20 | do | 21 | 163.6 |
| 21 | do | 25 | 200.2 |
| 22 | do | 15 | 181.3 |
| 23 | do | −2 | 210.8 |
| Average | | +14 | 188.2  S.E.M. ±8.1 |

As indicated in Table II, rats fed the xylitol containing diet exhibited only 50.6% the rate of lipogenesis in vivo of that of glucose-fed rats; 35.8% of that of fructose-fed rats and 41.7% of that of sucrose-fed rats.

EXAMPLE 2

This example illustrates the effect of xylitol on lipogenesis as determined in vitro by lipogenic enzyme levels in rat liver.

Charles River female rats weighing 150–190 gms. were adapted to glucose, fructose, sucrose and xylitol as described in Example 1. The lipogenic enzyme activity was measured by determining the amount of $^{14}$C citrate incorporated per gram of tissue per 30 minutes. The weight of the rats was also determined. The results are shown in Table III.

The test was carried out as follows:

Charles River female rats, 150–190 gms., used in the following experiments were fasted for 2 days and refed various high carbohydrate diets as described in Example 1. On the last day of refeeding, approximately 5 hours after feeding, the rats were killed by decapitation. Their livers were excised rapidly, weighed, transferred to 50 ml. beakers in ice and crudely minced in 3× tissue volume of ice cold 0.25 M sucrose. Then the minced livers were transferred to glass homogenizing tubes and homogenized with 5 strokes of a drill press driven Teflon pestle. The resulting homogenates were centrifuged in a Spinco L–2 ultracentrifuge at 105,000 g. for 30 mins. at 0°. The resulting clear supernatant was withdrawn with a 5 cc. glass syringe and placed immediately on ice. An 0.2 ml. aliquot of this high speed supernatant was first activated by incubation at 37° for 25 mins. in 20 mM. glycylglycine-NaOH buffer 7.4–7.6, 12 mM. $MgCl_2$ and 0.1 mM. dithiothreitol in a total volume of 0.4 ml. Lipogenic enzyme activity was measured in accordance with the method of Fang and Lowenstein, Biochem. J., vol. 105, p. 803 (1967), using the following: Each 1 ml. reaction mixture contained 22 mM. potassium carbonate, 17 mM. dithiothreitol, 4.4 mMl.malate, 1.8 mM. ATP, 4.4 mM. glucose-6 phosphate, 3.5 mM. potassium phosphate pH 7.4, 0.17 mM. CoA, 0.15 mM. NAD, 0.58 mM. NADP and 20 mM. 1,5 $^{14}C$ citrate (Specific Activity=15.4 mc./mM.). All assays were performed in triplicate. The reaction was started by the addition of activated high speed supernatant and continued for 20 minutes at 37°. It was stopped by the addition of 2.0 ml. 5 N NaOH and saponification carried out at 90° for 4 hours. Samples were acidified with 2.5 ml. 5 N $H_2SO_4$ and extracted twice with 5 ml. of petroleum ether (40–60°). Supernatants were added directly to glass counting vials, evaporated to dryness and 10 ml. toluene-PPO-POPOP scintillation fluid added. Samples were analyzed for absolute activity in a Parkard Tri Carb. Data is expressed as m$\mu$M. of $^{14}C$ citrate incorporated/gm. of tissue/30 mins.

TABLE III

| Rat No. | Diet percent carbohydrate by weight | Weight gain (gm.) during refeeding | m$\mu$M./gm./30 min. |
|---|---|---|---|
| 1 | 20% glucose | 7 | 46 |
| 2 | do | 38 | 174 |
| 3 | do | 21 | 132 |
| Average | | +22 | 117  S.E.M. ±37 |
| 4 | 20% fructose | 22 | 108 |
| 5 | do | 43 | 144 |
| 6 | do | 23 | 108 |
| Average | | +29 | 120  S.E.M. ±11 |
| 7 | 20% sucrose | 15 | 72 |
| 8 | do | 45 | 162 |
| 9 | do | 6 | 150 |
| Average | | +18 | 128  S.E.M. ±28 |
| 10 | 20% xylitol | 24 | 84 |
| 11 | do | 1 | 10 |
| 12 | do | 1 | 18 |
| Average | | +8 | 37  S.E.M. ±23 |

As indicated in Table III, rats fed the xylitol diet exhibited an induction of lipogenic enzymes of only 28.0% that of glucose-fed rats, 30.8% that of fructose-fed rats and 28.9% that of surcose-fed rats.

I claim:
1. A method of reducing fatty acid synthesis in non-diabetic mammals which comprises orally administering to said mammals a diet having removed therefrom 5% to about 25% by weight of rapidly absorbed mono- and disaccharide carbohydrates and replaced with a sufficient amount of xylitol to provide 5% to 25% by weight of xylitol in said diet.

References Cited

Kuhfahl, Chem. Abst., vol. 71 (1969), p. 78809f.
Opitz, Chem. Abst., vol. 65 (1946), p. 20717c.
Kuhfahl, Chem. Abst., vol. 70 (1969), p. 104471r.
Baessler et al., Chem. Abst., vol. 64 (1966), p. 14708d.

SAM ROSEN, Primary Examiner